US007680007B2

(12) United States Patent
Ishii

(10) Patent No.: US 7,680,007 B2
(45) Date of Patent: Mar. 16, 2010

(54) OPTICAL STATE RECOGNIZER, INFORMATION PROCESSOR, AND OPTICAL STATE RECOGNIZING METHOD

(75) Inventor: Ko Ishii, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 506 days.

(21) Appl. No.: 11/659,365

(22) PCT Filed: Aug. 3, 2005

(86) PCT No.: PCT/JP2005/014181

§ 371 (c)(1),
(2), (4) Date: Feb. 5, 2007

(87) PCT Pub. No.: WO2006/013879

PCT Pub. Date: Feb. 9, 2006

(65) Prior Publication Data

US 2008/0084804 A1    Apr. 10, 2008

(30) Foreign Application Priority Data

Aug. 6, 2004    (JP)    ............................. 2004-231285

(51) Int. Cl.
*G11B 11/00* (2006.01)
(52) U.S. Cl. ................. 369/53.27; 369/112.05
(58) Field of Classification Search ........................ None
See application file for complete search history.

(56) References Cited

U.S. PATENT DOCUMENTS

| 5,359,589 A | * | 10/1994 | Mashimo | ................. 369/47.51 |
| 5,805,559 A | * | 9/1998 | Murakami et al. | ......... 369/47.5 |
| 2004/0027949 A1 | * | 2/2004 | Matsuura et al. | ......... 369/47.51 |

FOREIGN PATENT DOCUMENTS

| JP | 8-339552 | 12/1996 |
| JP | 2003-67949 | 3/2003 |
| JP | 2003-162832 | 6/2003 |
| JP | 2003-272190 | 9/2003 |
| JP | 2005-293807 | 10/2005 |

* cited by examiner

*Primary Examiner*—Paul Huber
(74) *Attorney, Agent, or Firm*—Kratz, Quintos & Hanson, LLP

(57) ABSTRACT

A disc device (100) implements information processing with respect to, for example, a zeroth recording layer of an optical disk by an information processing section (510), and outputs a double-layer main voltage value and a double-layer sub voltage value corresponding to the intensities of a zeroth-order light beam and ±first-order light beams which are received by a photodetecting element (350) to an offset calculating section (522) by a voltage value acquiring section (521). The voltage value acquiring section (521) stores voltage values corresponding to the intensities of the zeroth-order light beam and ±first-order light beams which are received by the photodetecting element (350) as a single-layer main voltage value and a single-layer sub voltage value in a memory (400) in a state where a single-layer disc is loaded. The offset calculating section (522) calculates a voltage value corresponding to the intensity of a stray light beam that is reflected by a first recording layer not intended for information processing as an offset voltage value on the basis of the respective voltage values.

7 Claims, 10 Drawing Sheets

OPTICAL STATE RECOGNIZER, INFORMATION PROCESSOR, AND OPTICAL STATE RECOGNIZING METHOD

This application is a 371 of PCT/JP05/14181, filed Aug. 3, 2005.

TECHNICAL FIELD

The present invention relates to an optical state recognizer, an information processor, and an optical state recognizing method which allow recognition of intensities of specific light beams that are received by a photodetecting device that receive at least a zeroth-order light beam and a pair of first-order light beams which are diffracted by a diffraction grating, irradiated on a recording surface of a recording medium, and reflected from the recording surface.

BACKGROUND ART

Up to now, there has been known a disc device that processes a disc-shaped recording medium such as an optical disc by the aid of an optical pickup as an information processor that reads information that has been recorded on a recording surface or records various types of information on the recording surface. The known optical pickup of the disc device is configured to control a position to which an optical beam is irradiated on the basis of the optical beam that has been outputted from a light source and reflected by the optical disc, for example, to implement the tracking servo control of an objective lens. As the tracking servo control, there has been known a configuration that diffracts the light beam that is outputted from the light source to detect a focal position (refer to, for example, Patent Document 1).

In the configuration disclosed in Patent Document 1, a laser beam is split into a zeroth-order light beam and ±first-order diffracted light beams by means of a diffraction grating. Further, the respective light beams are converged so that the intervals of three convergent spots (hereinafter, of those three convergent spots, the central convergent spot will be referred to as "a main spot", and convergent spots at both sides of the main spot will be referred to as "side spots") that are formed on the recording surface of the optical disc substantially coincide with ½ of a cycle of guide grooves that are defined in the optical disc. After that, the optical disc reflected light beams of the respective spots are received by ³⁄₂ divided or ³⁄₄ divided light receiving surfaces, and subjected to subtraction processing by means of a subtracter, thereby detecting a push-pull signal Sa of the main spot, and push-pull signals Sb and Sc of the respective sub-spots. Then, when the push-pull signals Sb and Sc of the respective side spots are subjected to addition processing, tracking error components within the respective signals are canceled, and only offset components are added and outputted as a signal Sd as in the conventional DPP (differential push pull) system. After that, the signal Sd is amplified by a given gain, and then subtracted from the push-pull signal Sa, thereby obtaining a configuration that detects an excellent tracking error signal in which only the offset components are removed from the signal Sa.

[Patent Document 1] JP-A 2003-272190 (right column of p. 4 to left column of p. 7)

DISCLOSURE OF THE INVENTION

Problems to be Solved by the Invention

Incidentally, there has been known a configuration of a double-layer structure where recording surfaces are laminated on each other in a thickness direction as an optical disc. The optical disc has a recording surface that reflects a part of irradiated light beam and transmits another part of light beam so as to condense the light beam even on the recording surface of a lower layer. With the above-mentioned configuration, in the conventional disc device configured as disclosed in Patent Document 1, in the case of using the optical disc of the double-layer structure, a part of light beam that is condensed on any intended recording surface is reflected on the other recording surface as a so-called stray light beam. For that reason, there arises a problem, for example, that the light beam is likely to be received in a state where the stray light is superimposed on the light beam that has been reflected by the intended reflection surface, which leads to malfunction.

The present invention has been made in view of the above-mentioned circumstances, and an object of the present invention is to provide an optical state recognizer, an information processor, and an optical state recognizing method which allow appropriate recognition of intensities of specific lights that are reflected by a recording medium.

Means for Solving the Problems

The present invention relates to an optical state recognizer for recognizing a state of a light beam that is reflected by the recording surface when the recording surface of a recording medium is irradiated with the light beam outputted from a light source, the optical state recognizer including: a reference light intensity information acquiring section for acquiring reference light intensity information corresponding to an intensity of a light beam reflected by the reference recording medium whose recording surface has a specific reflection characteristic; a detected light intensity information generating section for detecting the intensity of the light beam reflected by the predetermined recording medium to generate detected light intensity information corresponding to the intensity; and a reflected state recognizing section for recognizing an optical reflected state of the predetermined recording medium on the basis of the reference light intensity information and the detected light intensity information.

The present invention relates to an information processor, including: the optical state recognizer according to the above-mentioned present invention; and an optical pickup including a light source, an optical device having a diffraction grating that transmits and diffracts a light beam outputted from the light source, a condensing section for condensing a transmitted light beam transmitted by the diffraction grating and a diffracted light beam diffracted by the diffraction grating on a recording surface of the recording medium, and a photodetector that receives the light beam reflected by the recording surface of the recording medium to output a predetermined signal, in which the detected light intensity information acquiring section of the optical status recognizer detects the intensity of the reflected light beam that is reflected on the basis of the predetermined signal from the photodetector.

The present invention relates to an optical state recognizing method of causing a calculating section to recognize a state of a light beam reflected by the recording surface when the recording surface of a recording medium is irradiated with the light beam that is outputted from a light source, in which the calculating section acquires reference light intensity information corresponding to an intensity of a light beam reflected by the reference recording medium whose recording surface has a specific reflection characteristic, detects the intensity of the light beam that is reflected by the predetermined recording medium to generate detected light intensity information corresponding to the intensity, and recognizes an optical reflected state of the predetermined recording medium on the basis of the reference light intensity information and the detected light intensity information.

Figure 1:
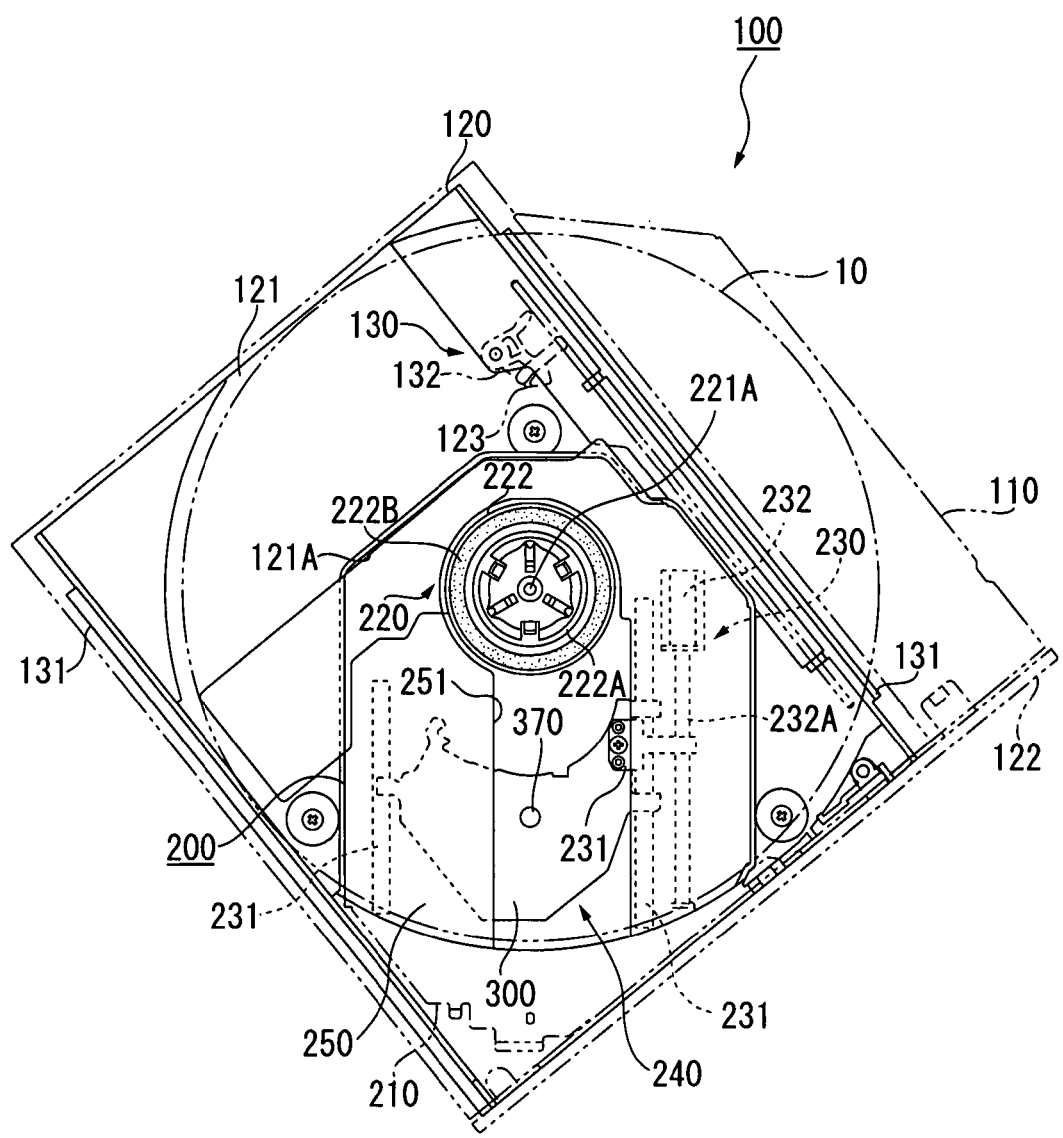
FIG. 1 is a partially notched plan view showing an outline configuration of a disc device according to an embodiment of the present invention.

EXPLANATION OF CODES 10 optical disc as given recording medium
300 optical pickup
320 semiconductor laser that is light source
331 grating element that is optical device as diffraction grating
332 semi-transmissive mirror as optical device
333 collimator lens as optical device
334 mirror as optical device
350 photodetecting element as photodetecting device
351 main photodetecting section as first region
352 first sub-photodetecting section as second region
353 second sub-photodetecting section as second region
370 objective lens as optical device and condensing section
380 objective lens moving section that also functions as tracking processing section
520 condensing state control section as calculating section
521 voltage value acquiring section that also functions as reference light intensity information acquiring section and detected light intensity information acquiring section, which constitutes optical state recognizer and information processor
522 offset calculating section that also functions as reflected state recognizing section and diffracted light intensity recognizing section, which constitutes optical state recognizer and information processor
523 movement control signal generating section that also functions as tracking process control section, which constitutes optical state recognizer and information processor
524 objective lens movement control section that also functions as tracking process control section, which constitutes optical state recognizer and information processor
Mn1, Mn2, Mn3, Mn4 double-layer main voltage value that is voltage value corresponding to intensity of first detected light intensity information
Mt1, Mt2, Mt3, Mt4 single-layer main voltage value that is voltage value corresponding to intensity of reference transmitted light intensity information
$R_0$ zeroth-order light beam as transmitted light
$R_{+1}$ +first-order light beam as diffracted light
$R_{-1}$ −first-order light beam as diffracted light
Sn1, Sn2, Sn3, Sn4 double-layer sub voltage value that is voltage value corresponding to intensity of second detected light intensity information
St1, St2, St3, St4 single-layer sub voltage value that is voltage value corresponding to intensity of reference transmitted light intensity information

BEST MODE FOR CARRYING OUT THE INVENTION

Hereinafter, a description will be given of an embodiment of the present invention with reference to the accompanying drawings. In this embodiment, a disc device that records and reads information on and from an optical disc which is a detachable disc recording medium is exemplified as a recording medium. However, the disc device may be capable of only reading or recording the information. As the recording medium, particularly, the disc recording medium is not limited to the optical disc, and can employ any disc recording medium using light such as a magnetic optical disc. In addition, the recording medium is not limited to the disc recording medium, and can be applied to any configuration, for example, a cylindrical configuration having a recording surface on an outer peripheral surface thereof or a tape configuration. In addition, the recording medium is not limited to a configuration in which an optical pickup is moved along the recording surface of the rotating optical disc in the substantially radial direction, and may employ a configuration in which, for example, the optical pickup is moved along the recording surface without rotating the optical disc to implement a recording process or a reading process. In the following description, a disc device of a so-called "slim disc drive" is exemplified. However, the present invention can employ any configuration such as a so-called slot-in type disc device, a configuration having a tray on which a disc recording medium is mounted, and which conveys the disc recording medium by ejecting and loading movements, or a configuration in which a pedestal that pivotably supports the disc recording medium is ejected or loaded. Further, the present invention is not limited to the disc device, and can be intended for any optical device such as a camera or a microscope, which appropriately executes processing on the basis of a receiving state of light being irradiated.

[Configuration of Disc Device]

Figure 2:
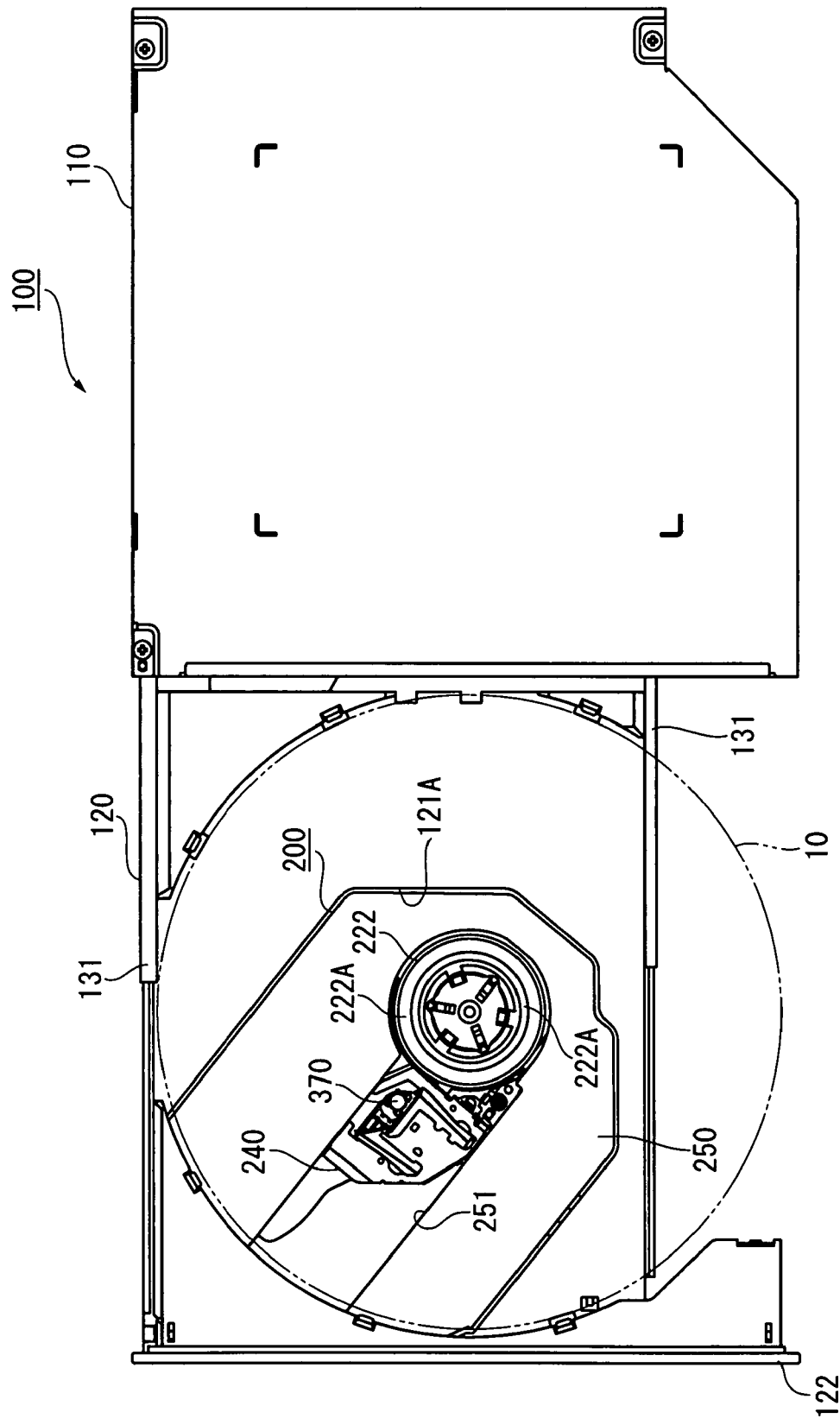
FIG. 2 is a partially notched plan view showing the outline configuration of the disc device in a state where a tray section is ejected according to the embodiment.
Figure 3:
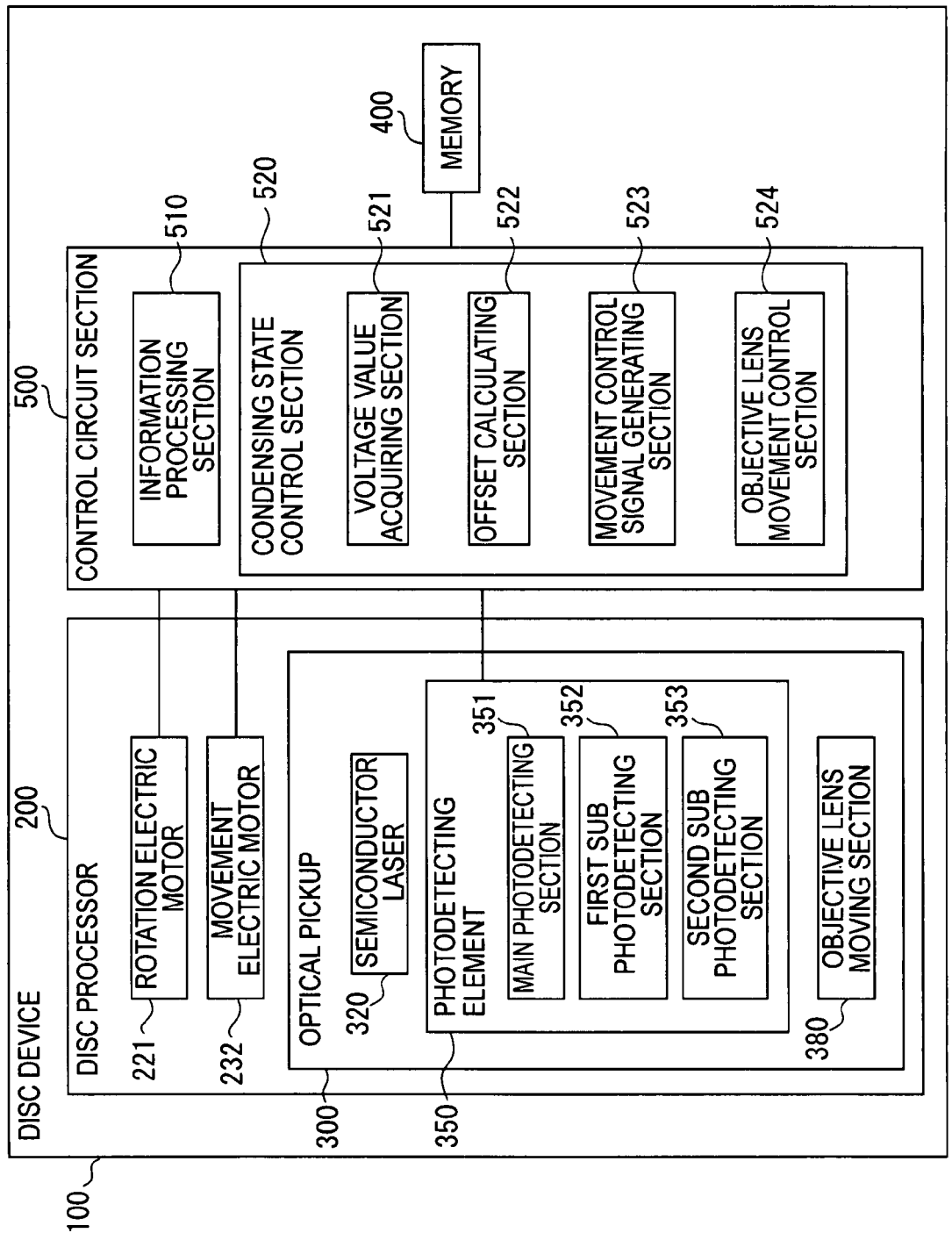
FIG. 3 is a block diagram showing the outline configuration of the disc device according to the embodiment.
Figure 4:
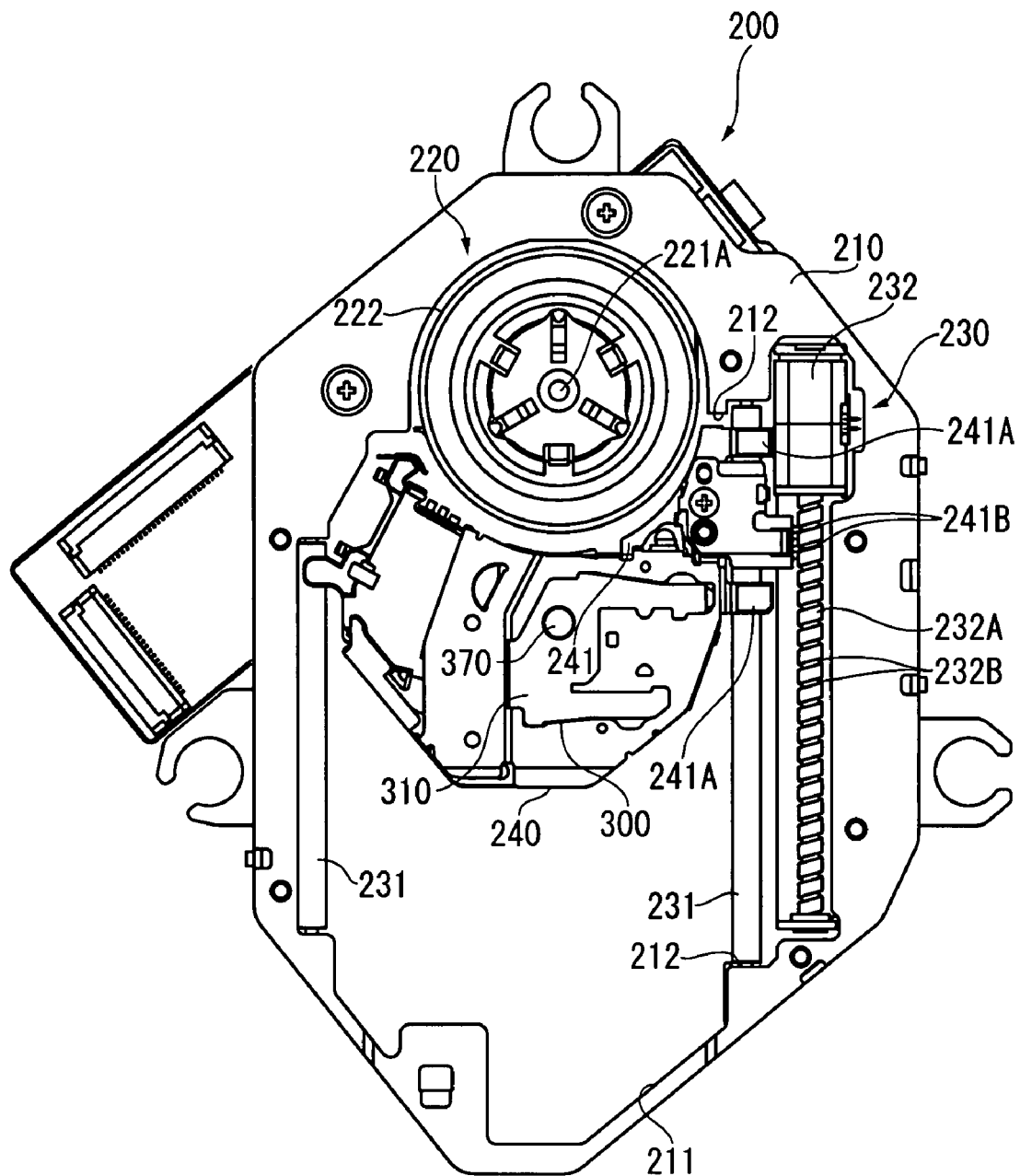
FIG. 4 is a partially notched plan view showing a disc processing section in the disc device according to the embodiment.

FIG. 1 is a partially notched plan view showing the outline configuration of a disc device. FIG. 2 is a partially notched plan view showing the outline configuration of the disc device in a state where a tray is ejected. FIG. 3 is a block diagram showing the outline configuration of the disc device. FIG. 4 is a partially notched plan view showing a disc processing section in the disc device.

Referring to FIGS. 1 to 3, reference numeral 100 denotes a disc device, and the disc device 100 is, for example, a so-called "slim disc drive" which is loaded in electric due to the elastic deformation so that the tray section 120 is ejected through the opening of the case body 110. The bias releasing section 132 is engaged with an engageable claw 123 disposed in the tray section 120 in a state where the tray section 120 is loaded into the case body 110, and the decorative plate 122 blocks the opening. The bias releasing section 132 releases the engaged state of the engageable claw 123 according to an ejection request of the tray section 120, for example, the operation of an ejection button.

The memory 400 appropriately readably stores a single-layer main voltage value Mti (i is a natural number of 1 to 4), a single-layer sub voltage value Stj (j is a natural number of 1 to 4), and a cancel voltage value Ej (j is a natural number of 1 to 4), which are outputted from the control circuit section 500, and all of which are to be described later therein. Also, the memory 400 stores various programs that are developed on an OS (operating system) that controls the operation of the overall disc device 100 therein. It is desirable that the memory 400 is formed of a memory that is so configured as to retain the storage, for example, even when a power supply suddenly fails due to blackout, such as a CMOS (complementary metal-oxide semiconductor) memory.

The disc processing section 200 that is disposed in the tray section 120 includes a frame-shaped pedestal 210 as shown in FIGS. 1 to 4. A disc rotary driving section 220 is positioned in the vicinity of the periphery of the pedestal 210. The disc rotary driving section 220 includes a rotation electric motor 221 that is a spindle motor, and a turntable 222 that is integrated with an output shaft 221A of the rotation electric motor 221.

A processing movement section 230 is disposed on the pedestal 210. The processing movement section 230 includes a pair of guide shafts 231 whose axial directions are substantially parallel to each other in the pedestal 210, and a movement electric motor 232 that is, for example, a stepping motor. An output shaft (not shown) of the movement electric motor 232 is interlocked integrally and coaxially with a lead screw 232A having spiral engaging grooves 232B defined on an outer peripheral surface thereof.

In addition, an information processing section 240 that is supported by the processing movement section 230 is disposed in the pedestal 210. The information processing section 240 includes a movement holding section 241 that is so held as to be bridged between the pair of guide shafts 231. The movement holding section 241 includes a holding section 241A into which the guide shafts 231 are movably fitted, and movement regulation claws 241B that are engaged with the engaging grooves 232B of the lead screw 232A which is interlocked with the output shaft of the movement electric motor 232. An optical pickup 300 that is connected to a control circuit section 500 so as to be able to exchange signals with respect to the control circuit section 500 is disposed in the movement holding section 241 of the information processing section 240. The optical pickup 300 is used to implement, under the control of the control circuit section 500, a reading process for reading various types of information that has been recorded on a recording surface of the optical disc 10 to output the various types of information to an output circuit, and a recording process for recording various types of information from the control circuit section 500 on the recording surface.

[Configuration of Optical Pickup]

Figure 5:
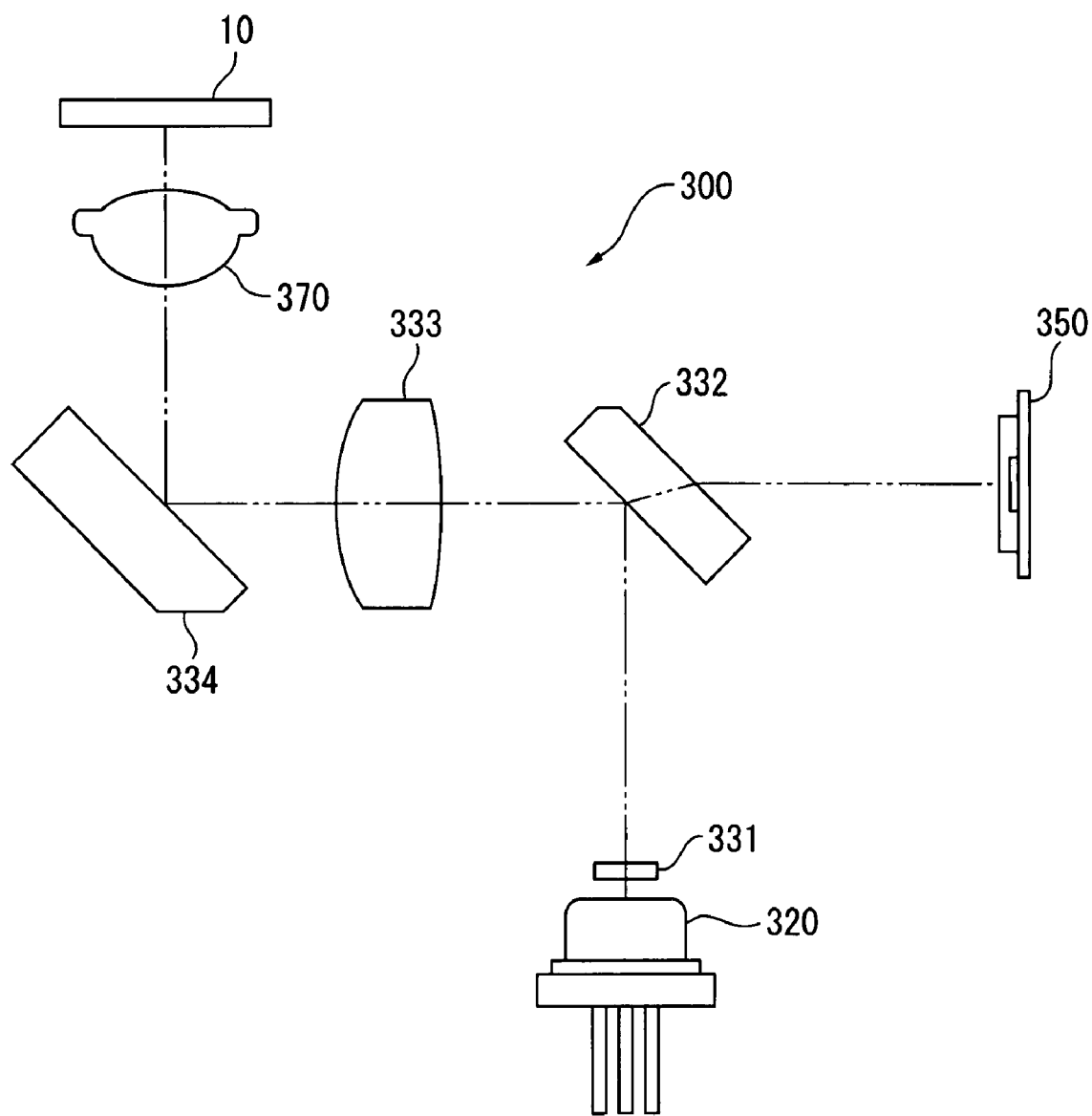
FIG. 5 is an explanatory diagram showing the outline configuration for explaining an optical path configuration of an optical pickup according to the embodiment.
Figure 6:
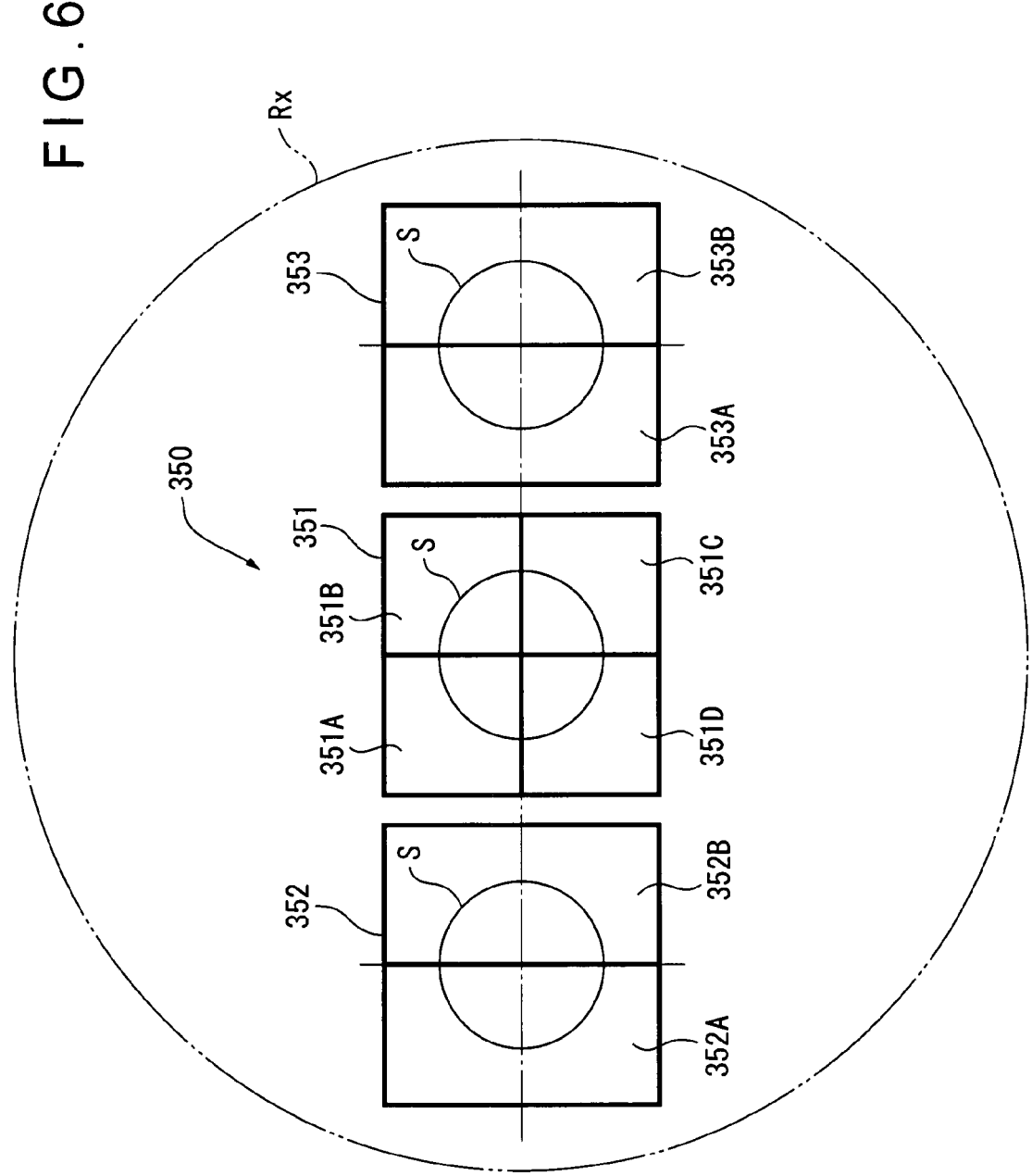
FIG. 6 is a plan view schematically showing a formation of respective photodetecting sections of a photodetecting element according to the embodiment.

Now, a description will be given in more detail of the configuration of the optical pickup 300 of the above-described disc device 100 with reference to the accompanying drawings. As the optical pickup 300, a configuration that is capable of processing both pieces of information from a CD (compact disc) and a DVD (digital versatile disc) as the optical disc 10 will be exemplified. However, as described above, the present invention can be so configured as to deal with the information processing of any recording media. As the light source, a configuration using a light source that is capable of outputting two outgoing light beams of two frequencies composed of a CD laser beam and a DVD laser beam will be exemplified. However, the present invention can also employ a configuration using plural light sources that output only the CD laser beam or the DVD laser beam, or a configuration using one light source that is capable of outputting plural outgoing light beams different in the wavelength. FIG. 5 is an explanatory diagram showing the outline configuration for explaining an optical path configuration of the optical pickup. FIG. 6 is a plan view schematically showing the configuration of the respective photodetecting sections of the photodetecting element.

The optical pickup 300 includes a holder 310 as partially shown in FIG. 4. The holder 310 can be so configured as to be integrated with a part of the movement holding section 241 or to be incorporated in the movement holding section 241. As shown in FIG. 5, a semiconductor laser 320 is disposed in the holder 310 as a light source that outputs a CD laser beam as an outgoing light beam which is a light beam having the wavelength for a CD and a DVD laser beam as an outgoing light beam which is a light beam having the wavelength for a DVD.

Also, a grating element 331 that is an optical device is disposed at the outgoing side of the semiconductor laser 320. The grating element 331 has a diffraction grating on a glass substrate (not shown), which diffracts the laser beam that is outputted from the semiconductor laser 320 into at least three light beams composed of a zeroth-order light beam and ±first-order light beams when the laser beam passes through the diffraction grating. That is, the diffraction grating diffracts the light beam from the semiconductor laser 320 into the zeroth-order light beam as a transmitted light beam and the ±first-order light beams as the diffracted light beams. The intensity of the zeroth-order light beam is extremely strong as compared with the intensity of the ±first-order light beams. In other words, the intensity of the zeroth-order light beam is made sufficient by diffraction so as to appropriately implement the reading process or the recording process of the information. There can be provided plural grating elements 331 for diffracting the CD laser beam and the DVD laser beam which are outputted from the semiconductor laser 320, respectively, or diffraction gratings can be disposed on both surfaces of the glass substrate, respectively.

In addition, a semi-transmissive mirror 332 that is an optical device is disposed in the holder 310 so as to be positioned on the optical axis of the semiconductor laser 320. The semi-transmissive mirror 332 reflects the respective zeroth-order light beam and ±first-order light beams of the CD laser beam and the DVD laser beam by about 90 degrees with respect to the optical axis direction. The semi-transmissive mirror 332 also transmits the respective zeroth-order light beam and ±first-order light beams of the CD laser beam and the DVD laser beam, which are inputted from the reflection direction. In addition, a collimator lens 333 is disposed in the holder 310. The collimator lens 333 functions as an optical device that adjusts the diameters and the spread angles of the respective zeroth-order light beam and ±first-order light beams of the CD laser beam and the DVD laser beam, which are reflected by the semi-transmissive mirror 332. Also, a mirror 334 is disposed in the holder 310. The mirror 334 functions as an optical device that reflects the respective zeroth-order light beam and ±first-order light beams of the CD laser beam and the DVD laser beam, which are transmitted by the collimator lens 333, by about 90 degrees with respect to the optical axis direction. A wavelength plate (not shown) for transmitting the respective zeroth-order light beam and ±first-order light beams of the CD laser beam and the DVD laser beam, which are reflected by the mirror 334, and a liquid crystal panel (not shown) for conducting wavefront aberration are disposed in the holder 310.

A photodetecting element 350 that receives the respective zeroth-order light beam and ±first-order light beams of the CD laser beam and the DVD laser beam, which are transmitted by the semi-transmissive mirror 332 to output a given signal is disposed as a photodetecting device in the holder 310. For example, a cylindrical lens (not shown) for astigmatism is disposed as an optical device between the semi-transmissive mirror 332 and the photodetecting element 350.

In addition, as shown in FIG. 5, an objective lens 370 is disposed in the optical pickup 300 as an optical device and a condensing section and is held by an objective lens holder (not shown). The objective lens 370 is so disposed as to be movable in a focus direction along the optical axis of the CD laser beam and the DVD laser beam, which are reflected by the mirror 334, and in a tracking direction perpendicular to the optical axis. The movement of the objective lens 370 is conducted by an objective lens moving section 380 that also functions as a tracking processing section having a magnetic substance, a magnet, and a coil (all of which are not shown) which are mounted to the holder 310 and the objective lens holder. Then, the cylindrical lens is fixed onto the holder 310 with a positional relationship in which the light condensing of the zeroth-order light beam on a main photodetecting section 351 of the photodetecting element 350 by means of the cylindrical lens becomes substantially circular at the substantially center position of the main photodetecting section 351, and linear in two diagonal directions in the main photodetecting section 351, in a normal state where the objective lens 370 is not moved.

As shown in FIG. 6, the photodetecting element 350 includes a main photodetecting section 351 as a first region that receives a zeroth-order light beam, a first sub-photodetecting section 352 as a second region that receives a +first-order light beam, and a second sub-photodetecting section 353 as the second region that receives a –first-order light beam. For the reception of the ±first-order light beams, a reverse configuration may be employed, that is, the first sub-photodetecting section 352 may receive the –first-order light beam, and the second sub-photodetecting section 353 may receive the +first-order light beam. The photodetecting element 350 is configured in a state where the first sub-photodetecting section 352 and the second sub-photodetecting section 353 are adjacent to each other on both sides of the main photodetecting section 351 in one direction, respectively. The main photodetecting section 351 has a configuration in which a rectangular region of a substantially square shape is divided into four sections crosswise, and includes a first main photodetecting region 351A, a second main photodetecting region 351B, a third main photodetecting region 351C, and a fourth main photodetecting region 351D, which are in a substantially square shape. The first sub-photodetecting section 352 has a configuration in which a substantially square region that is substantially identical to that of the main photodetecting section 351 is divided into two sections along one direction in which the main photodetecting section 351 is adjacent to the first sub-photodetecting section 352 and the second sub-photodetecting section 353. The first sub-photodetecting section 352 has a first A sub-photodetecting region 352A and a first B sub-photodetecting region 352B. In addition, the second sub-photodetecting section 353 is formed to have the same configuration as that of the first sub-photodetecting section 352, and includes a second A sub-photodetecting region 353A and a second B sub-photodetecting region 353B. Each of the respective first to fourth main photodetecting regions 351A to 351D, the first A sub-photodetecting region 352A, the first B sub-photodetecting region 352B, the second A sub-photodetecting region 353A, and the second B sub-photodetecting region 353B outputs a voltage value including a direct current component (hereinafter referred to as "DC component") and an alternating current component (hereinafter referred to as "AC component") corresponding to the intensity of the received light beam to the control circuit section 500. The control circuit section 500 implements tracking operation and focusing operation on the basis of the respective voltage values that are outputted from those photodetecting elements 350.

The respective voltage values that are outputted from the photodetecting element 350 are outputted at a given ratio of the voltage value from the main photodetecting section 351 and the voltage values from the sub-photodetecting sections 352 and 353 of 4:1, for example. As a configuration for outputting the respective voltage values at the given ratio, a configuration can be exemplified in which the respective photodetecting sections 351, 352, and 353 are disposed in a state where the intensity of the light beam that is received by the main photodetecting section 351 and the intensities of the light beams that are received by the respective sub-photodetecting sections 352 and 353 are at the given ratio. Also, a configuration in which the voltage values that are outputted from the respective photodetecting sections 351, 352, and 353 are amplified so as to meet the given ratio by an amplifier (not shown) to be outputted can be exemplified.

The optical pickup 300 is configured in such a manner that the cylindrical lens and the photodetecting element 350 are arranged with a positional relationship in which the zeroth-order light beam and the ±first-order light beams are irradiated on the respective centers of the main photodetecting section 351, the first sub-photodetecting section, and the second sub-photodetecting section in a substantially circular shape. Irradiated regions S that are irradiated with the ±first-order light beams change according to the characteristic change of an optical path of a light beam that is received from the semiconductor laser 320 after being reflected by the optical disc 10 with respect to the above-mentioned normal state. In this example, the characteristic change of the optical path can be exemplified by a tolerance of the wavelength of a light beam that is outputted from the semiconductor laser 320, a tolerance of the interval dimension of the diffraction grating of the grating element 331, a distance tolerance between the semiconductor laser 320 and the grating element 331 which are arranged, a tolerance of a distance or an inclination between the cylindrical lens and the photodetecting element 350, and a tolerance of the parts of the respective optical devices per se, as well as a change in the distance or inclination which is caused by, for example, a change in a state of a resin for fixing the cylindrical lens with the elapse of time.

As other elements, in the optical pickup 300, arranged are a front monitor photodetecting element that receives a part of the CD laser beam and the DVD laser beam, detects the amount of received light, and adjusts the output of the semiconductor laser 320, a collimator lens 333 that condenses the light beams on the photodetecting element 350, and optical devices such as various prisms and mirrors.

(Configuration of Control Circuit Section)

Figure 7:
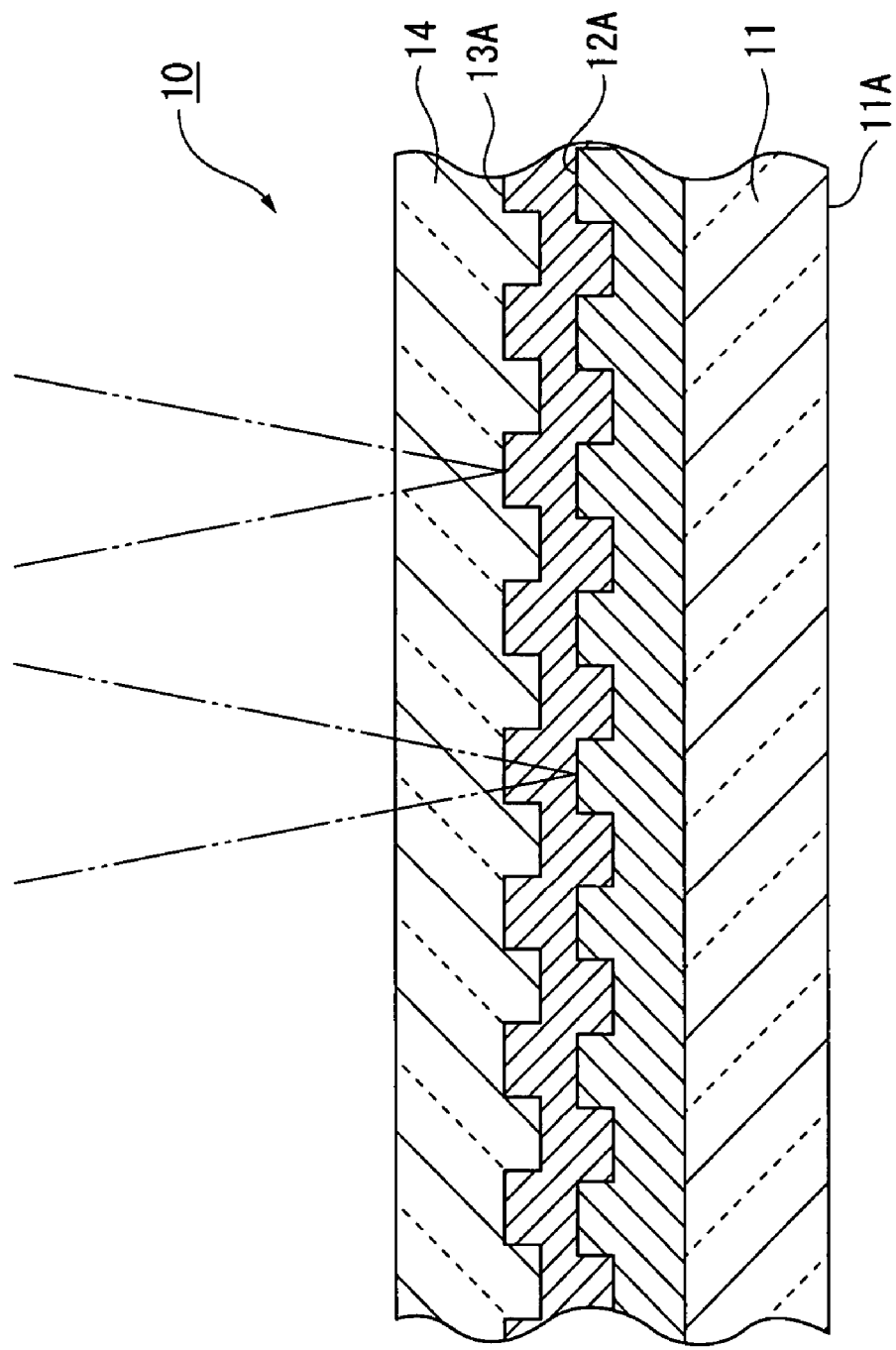
FIG. 7 is a partially notched cross-sectional view schematically showing an outline configuration of an optical disc that implements information processing in the disc device according to the embodiment.
Figure 8:
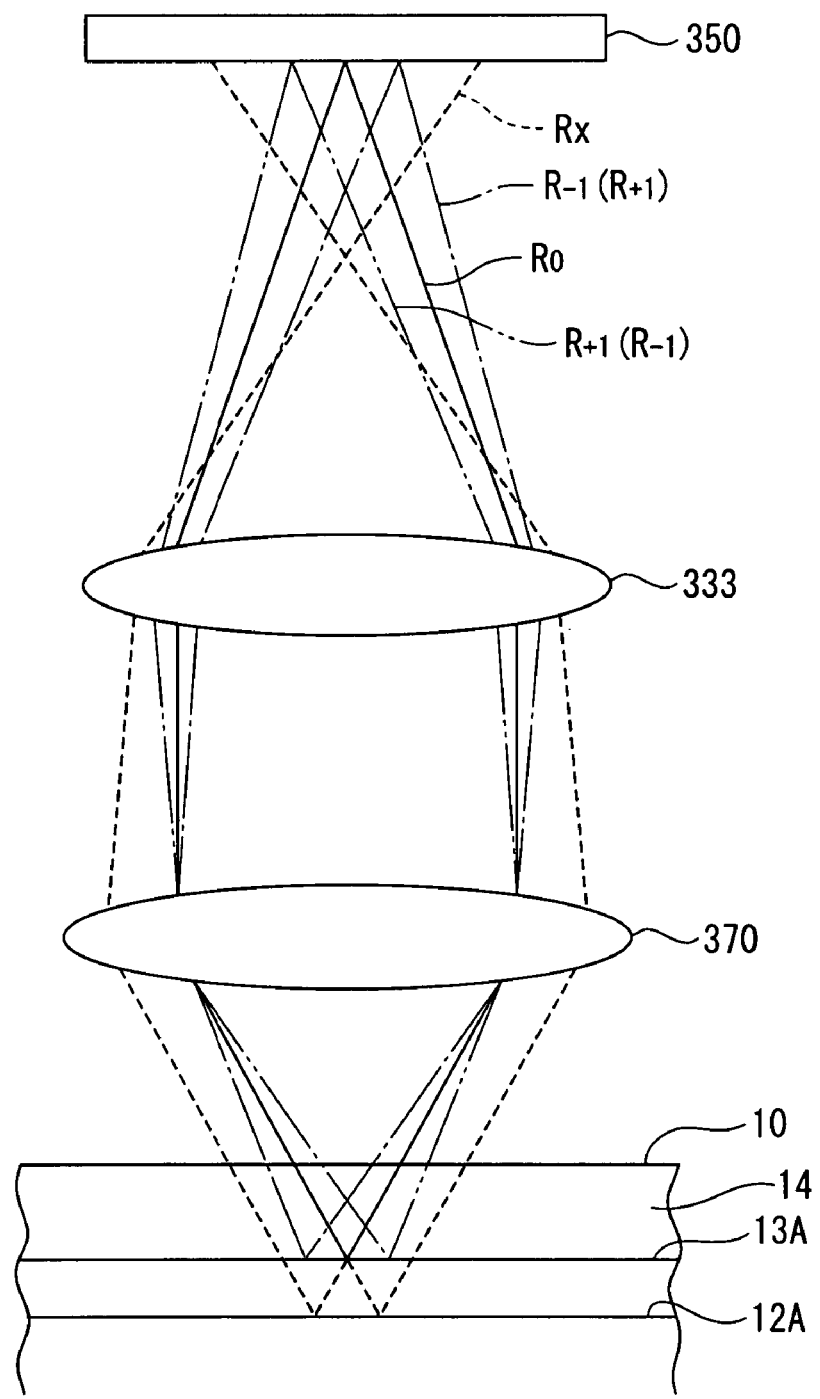
FIG. 8 is an explanatory diagram conceptually showing an optical path in a state where information is processed by a zeroth recording layer in the optical disc according to the embodiment.
Figure 9:
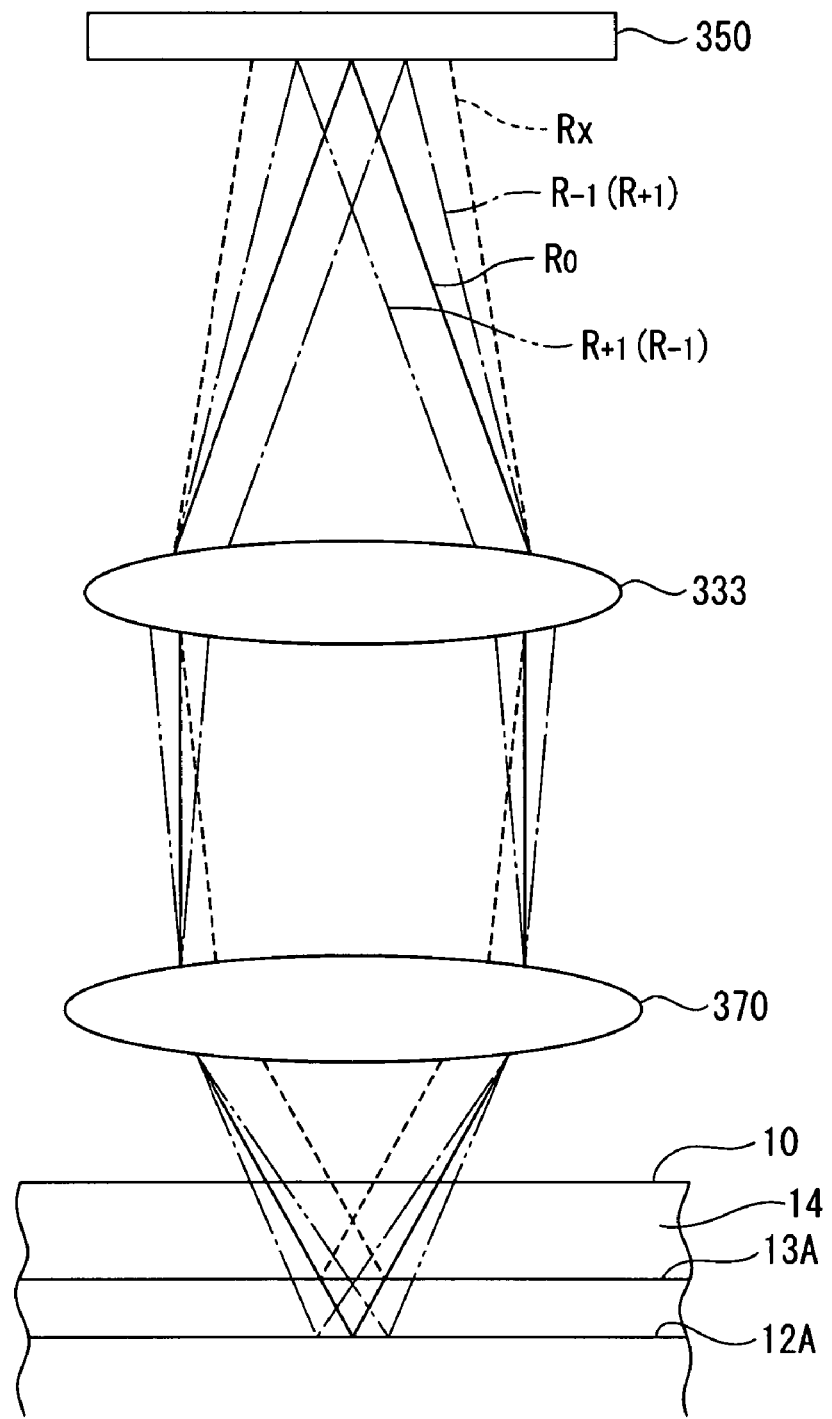
FIG. 9 is an explanatory diagram conceptually showing an optical path in a state where information is processed by a first recording layer in the optical disc according to the embodiment.

Subsequently, a description will be given in more detail of the configuration of the control circuit section 500 of the above-described disc device 100. FIG. 7 is a partially notched cross-sectional view schematically showing the outline configuration of an optical disc that implements information processing in the disc device. FIG. 8 is an explanatory diagram conceptually showing an optical path in a state where information is processed by a zeroth recording layer in the optical disc. FIG. 9 is an explanatory diagram conceptually showing an optical path in a state where information is processed in a first recording layer in the optical disc.

The control circuit section 500 is configured on a circuit board on which, for example, various electric parts are mounted as a circuit structure. The control circuit section 500 includes an information processing section 510, and a condensing state control section 520 as a calculating section as shown in FIG. 3.

The information processing section 510 detects the loading of the optical disc 10, and implements information processing such as a reading process, that is, for example, the reproduction of recorded information, or a recording process. More specifically, the information processing section 510 determines whether the optical disc 10 has been loaded, or not. For example, the information processing section 510 determines whether the optical disc 10 exists, or not, by the aid of the detecting operation of a disc detecting section such as a sensor or switch (not shown) which is additionally disposed, or the detecting operation based on the presence or absence of a reflected light beam by controlling the optical pickup 300. When the information processing section 510 determines that no optical disc 10 is loaded, the information processing section 510 stands ready to insert the optical disc 10. When the information processing section 510 determines that the optical disc 10 has been loaded, the information processing section 510 determines whether a request for implementing the information processing exists, or not. In the case where no request for implementing the information processing exists, the information processing section 510 stands by for the request for implementing the information processing. On the other hand, in the case where the request for implementing the information processing exists, the information processing section 510 appropriately operates the rotation electric motor 221, the movement electric motor 232, and the optical pickup 300 to implement the information processing. In other words, the information processing section 510 allows the light beam to be outputted from the semiconductor laser 320, the recording surface of the optical disc 10 to be irradiated with the light beam, and the reflected light beam to be reflected by the photodetecting element 350 for processing.

The light receiving status of the photodetecting element 350 in the optical pickup 300 will be exemplified below. In this example, as the optical disc 10, a double-layer structure such as a DVD+R (digital versatile disc-recordable plus) in which two recording surfaces are laminated in the thickness direction as shown in FIG. 7 is exemplified. The optical disc 10 has a disc board 11 whose outer surface is a label surface 11A. The other surface of the disc board 11 is equipped with a first recording layer 12A. Tracks are substantially spirally or substantially concentrically defined in the surface of the first recording layer 12A. The surface of the first recording layer 12A has a given reflectivity. A zeroth recording layer 13A having a given transmittance and a given reflectivity is formed on the surface side of the first recording layer 12A. Tracks are substantially spirally or substantially concentrically defined in the surface of the zeroth recording layer 13A as with the first recording layer 12A. A protective layer 14 is formed on the surface of the zeroth recording layer 13A.

In executing the information processing, an optical path along which the optical disc 10 is irradiated with a light beam is shown in FIGS. 8 and 9. FIGS. 8 and 9 are diagrams in which track contours are omitted, and diagrams showing the zeroth-order light beam that is particularly intense as a stray light beam. More specifically, in the information processing of the zeroth recording layer 13A, as shown in FIG. 8, a zeroth-order light beam $R_0$ and ±first-order light beams $R_{+1}$ and $R_{-1}$ which are diffracted by the grating element 331 and collimated by the collimator lens 333 are condensed on the zeroth recording layer 13A by the aid of the objective lens 370 that is appropriately moved by tracking operation and focusing operation. In addition, since the zeroth recording layer 13A has the given transmittance, the zeroth-order light beam $R_0$ and the ±first-order light beams $R_{+1}$ and $R_{-1}$ are also condensed on the first recording layer 12A in a defocused state. The main photodetecting section 351, the first sub-photodetecting section 352, and the second sub-photodetecting section 353 of the photodetecting element 350 are irradiated with the zeroth-order light beam $R_0$ and the ±first-order light beams $R_{+1}$ and $R_{-1}$, which are reflected by the zeroth recording layer 13A, through the separately-provided collimator lens 333 and cylindrical lens, respectively. Also, the photodetecting element 350 is irradiated with the zeroth-order light beam $R_0$ and the ±first-order light beams $R_{+1}$ and $R_{-1}$, which are reflected by the first recording layer 12A, likewise. The light beam that is reflected by the first recording layer 12A which is not the zeroth recording layer 13A to be subjected to the information processing is received by the photodetecting element 350 as a so-called stray light beam $R_x$.

Likewise, in the information process of the first recording layer 12A, as shown in FIG. 9, the zeroth-order light beam $R_0$ and the ± first-order light beams $R_{+1}$ and $R_1$ are condensed on the first recording layer 12A by the aid of the objective lens 370 that is appropriately moved by tracking operation and focusing operation, and are also condensed on the zeroth recording layer 13A that is positioned in front of the first recording layer 12A in a defocused state. The main photodetecting section 351, the first sub-photodetecting section 352, and the second sub-photodetecting section 353 of the photodetecting element 350 are irradiated with the zeroth-order light beam $R_0$ and the ± first-order light beams $R_{+1}$ and $R_1$, which are reflected by the first recording layer 12A, through the separately-provided collimator lens 333 and cylindrical lens, respectively. Also, the photodetecting element 350 is irradiated with the zeroth-order light beam $R_0$ and the ±first-order light beams $R_{+1}$ and $R_1$, which are reflected by the zeroth recording layer 13A, as the stray light beams $R_x$, likewise. As described above, the photodetecting element 350 is irradiated with the zeroth-order light beam $R_0$ and the first-order light beams $R_{+1}$ and $R_1$ which have been reflected by the zeroth recording layer 13A as the stray light beams, respectively. However, because the stray light beams of the ± first-order light beams $R_{+1}$ and $R_1$ are naturally low in the level, the amount of stray light beams is small, and an influence thereof is small. For that reason, for convenience of description, FIGS. 8 and 9 show only the stray light beam $R_x$ of the zeroth-order light beam $R_0$ which is high in the level.

The state of receiving the zeroth-order light beam $R_0$ and ±first-order light beams $R_{+1}$, and $R_{-1}$ reflected by the photodetecting element 350 is a state in which the stray light beam $R_x$ is superimposed on the substantially circular region including the main photodetecting section 351, the first sub-photodetecting section 352, and the second sub-photodetecting section 353, as shown in FIG. 6. Since the zeroth-order light beam $R_0$ is relatively intense, the light receiving state of the main photodetecting section 351 is that the intensity of the zeroth-order light beam $R_0$ per unit area is far higher than the intensity of the stray light beam $R_x$ per unit area which is received in a state where the stray light beam $R_x$ is widely diffused. For that reason, in the light receiving states of the respective first to fourth main photodetecting regions 351A to 351D of the main photodetecting section 351, the state of receiving the zeroth-order light beam $R_0$ can be sufficiently detected even if the stray light beam $R_x$ is superimposed on the zeroth-order light beam $R_0$, thereby generating a focus error signal for excellent focusing based on a voltage value that is outputted from the main photodetecting section 351.

On the other hand, since the ±first-order light beams $R_{+1}$ and $R_{-1}$ is relatively low in the intensity, the light receiving states of the first sub-photodetecting section 352 and the second sub-photodetecting section 353 are that a difference between the intensity of the stray light beam $R_x$ per unit area and the intensities of the ±first-order light beams $R_{+1}$ and $R_{-1}$ per unit area is reduced.

The condensing state control section 520 detects a tracking error or a focus error on the basis of the condensing state on the optical disc 10, and appropriately moves the objective lens 370 to properly condense the light beam on the optical disc 10. The condensing state control section 520 includes a voltage value acquiring section 521 that also functions as a reference light intensity information acquiring section and a detected light intensity information acquiring section, an offset calculating section 522 that also functions as a reflected state recognizing section and a diffracted light intensity recognizing section, a movement control signal generating section 523 that also functions as a tracking process control section, and an objective lens movement control section 524 that also functions as a tracking process control section. The voltage value acquiring section 521, the offset calculating section 522, the movement control signal generating section 523, and the objective lens movement control section 524 constitute an optical state recognizer of the present invention. The optical pickup 300, the voltage value acquiring section 521, the offset calculating section 522, the movement control signal generating section 523, and the objective lens movement control section 524 constitute an information processor of the present invention. In addition, the optical state recognizer and the information processor according to the present invention may be so configured as to provide no movement control signal generating section 523 and no objective lens movement control section 524.

The voltage value acquiring section 521 acquires a voltage value from the photodetecting element 350, and appropriately readably stores the acquired voltage value in the memory 400. More specifically, when the voltage value acquiring section 521 recognizes that the single-layer main voltage value Mti and the single-layer sub voltage value Stj are not stored in the memory 400, the voltage value acquiring section 521 conducts a process of detecting the loading of a single-layer disc (not shown) as a reference disc recording medium having a circular shape and a single-layer structure with one recording surface. For example, the voltage value acquiring section 521 determines whether the single-layer disc exists, or not, through the same processing as that at the time of detecting the loading of the optical disc 10. Then, when the voltage value acquiring section 521 determines that the single-layer disc is not loaded, the voltage value acquiring section 521 stands by for the insertion of the single-layer disc. On the other hand, when the voltage value acquiring section 521 determines that the single-layer disc is loaded, the voltage value acquiring section 521 appropriately controls, for example, the operation of the rotation electric motor 221, the movement electric motor 232, and the semiconductor laser 320 to irradiate the recording surface of the single-layer disc at a given position with a light beam.

In executing the process of irradiating the single-layer disc with the light beam, an optical path along which the single-layer disc is irradiated with the light beam is configured, for example, as follows. That is, when it is assumed that the recording surface of the single-layer disc exists, for example, at only a position corresponding to the first recording layer 12A of the optical disc 10 as shown in FIG. 9, the zeroth-order light beam $R_0$ and the ±first-order light beams $R_{+1}$ and $R_{-1}$ are condensed on the first recording layer 12A in a substantially given circular shape by the aid of the objective lens 370. Then, the main photodetecting section 351, the first sub-photodetecting section 352, and the second sub-photodetecting section 353 of the photodetecting element 350 are irradiated with the zeroth-order light beam $R_0$ and the ±first-order light beams $R_{+1}$ and $R_{-1}$, which are reflected by the first recording layer 12A, respectively. In this example, in the case of the single-layer disc, since there exist no zeroth recording layer 13A, that is, there is no portion on which the light beam is condensed in a defocused state as in the optical disc 10, the photodetecting element 350 is not irradiated with the stray light beam $R_x$.

When the voltage value acquiring section 521 acquires the voltage values from the first, second, third, and fourth main photodetecting regions 351A, 351B, 351C, and 351D as reference transmitted light intensity information that is reference light intensity information in a state where the single-layer disc is loaded, respectively, the voltage value acquiring section 521 appropriately readably stores those respective voltage values as single-layer main voltage values Mt1, Mt2, Mt3, and Mt4 in the memory 400. Also, when the voltage value acquiring section 521 acquires the voltage values from the first A sub-photodetecting region 352A, the first B sub-photodetecting region 352B, the second A sub-photodetecting region 353A, and the second B sub-photodetecting region 353B, as reference diffracted light intensity information that is reference light intensity information, respectively, the voltage value acquiring section 521 appropriately readably stores those respective voltage values as single-layer sub voltage values St1, St2, St3, and St4 in the memory 400. In this example, since the photodetecting element 350 is not irradiated with the stray light beam $R_x$ as described above, the single-layer main voltage value Mti is a voltage value corresponding to the intensity of the zeroth-order light beam $R_0$, and the single-layer sub voltage value Stj is a voltage value corresponding to the intensities of the ±first-order light beams $R_{+1}$ and $R_{-1}$. Also, the single-layer main voltage value Mti is a voltage value corresponding to the intensity of the reference transmitted light intensity information of the present invention, and the single-layer sub voltage value Stj is a voltage value corresponding to the intensity of the reference diffracted light intensity information of the present invention.

When the voltage value acquiring section 521 acquires the voltage values from the first, second, third, and fourth main photodetecting regions 351A, 351B, 351C, and 351D as first detected light intensity information that is detected light intensity information in a state where the optical disc 10 is loaded, respectively, the voltage value acquiring section 521 outputs those respective voltage values to the offset calculating section 522 as double-layer main voltage values Mn1, Mn2, Mn3, and Mn4. Also, when the voltage value acquiring section 521 acquires the voltage values from the first A sub-photodetecting region 352A, the first B sub-photodetecting region 352B, the second A sub-photodetecting region 353A, and the second B sub-photodetecting region 353B as detected light intensity information that is detected light intensity information, respectively, the voltage value acquiring section 521 outputs those respective voltage values to the offset calculating section 522 as double-layer sub voltage values Sn1, Sn2, Sn3, and Sn4. In this example, since the photodetecting element 350 is irradiated with the stray light beam $R_x$ as described above, the double-layer main voltage value Mni (i is a natural number of 1 to 4) is a voltage value corresponding to the intensities of the zeroth-order light beam $R_0$ and the stray light beam $R_x$, and the double-layer sub voltage value Snj (j is a natural number of 1 to 4) is a voltage value corresponding to the intensities of the ±first-order light beams $R_{+1}$ and $R_{-1}$ and the stray light beam $R_x$. In the respective first to fourth main photodetecting regions 351A to 351D of the main photodetecting section 351, since the zeroth-order light beam $R_0$ is sufficiently larger in the amount of light than the stray light beam $R_x$ as described above, the voltage value corresponding to the stray light beam $R_x$ included in the double-layer main voltage value Mni can be ignored. The double-layer main voltage value Mni is a voltage value corresponding to the intensity of the first detected light intensity information of the present invention, and the double-layer sub voltage value Snj is a voltage value corresponding to the intensity of the second detected light intensity information of the present invention.

When the voltage value acquiring section 521 recognizes that the respective voltage values Mti and Stj are stored in the memory 400, the voltage value acquiring section 521 executes a process of outputting the respective voltage values Mni and Snj without implementing a process of storing the respective voltage values Mti and Stj.

The offset calculating section 522 calculates an offset voltage value Cj corresponding to the intensity of the stray light beam $R_x$. More specifically, when the offset calculating section 522 acquires the double-layer main voltage value Mni and the double-layer sub voltage value Snj from the voltage value acquiring section 521, the offset calculating section 522 appropriately reads the single-layer main voltage value Mti and the single-layer sub voltage value Stj from the memory 400. Then, the offset calculating section 522 breaks down the double-layer sub voltage value Snj into a first-order light voltage value Bj that is found on the basis of the following expression 1 and an offset voltage value Cj that is found on the basis of the following expression 2. In this example, the first-order light voltage values B1, B2, B3, and B4 are voltage values corresponding to the intensities of the light beams resulting from subtracting the stray light beam $R_x$ from the light beams that are received by the first A sub-photodetecting region 352A, the first B sub-photodetecting region 352B, the second A sub-photodetecting region 353A, and the second B sub-photodetecting region 353B at the time when the optical disc 10 is loaded, that is, the intensities of the ±first-order light beams $R_{+1}$ and $R_{-1}$. The offset voltage values C1, C2, C3, and C4 are voltage values of the offsets corresponding to the intensities of the stray light beams $R_x$ which are received by the first A sub-photodetecting region 352A, the first B sub-photodetecting region 352B, the second A sub-photodetecting region 353A, and the second B sub-photodetecting region 353B. In obtaining the first-order light voltage value Bj and the offset voltage value Cj, the offset calculating section 522 averages the AC components of the respective voltage values Mti, Mni, Stj, and Snj in a given period of time, to thereby convert the AC components into DC components, and implement the calculation. For that reason, the first-order light voltage value Bj and the offset voltage value Cj become voltage values including only the DC components.

$$Bj=Stj\times(Mn1+Mn2+Mn3+Mn4)/(Mt1+Mt2+Mt3+Mt4) \quad \text{(Ex. 1)}$$

$$Cj=Snj-Bj \quad \text{(Ex. 2)}$$

Also, the offset calculating section 522 finds cancel voltage values E1, E2, E3, and E4 resulting from canceling the offset voltage values C1, C2, C3, and C4 from the double-layer sub voltage values Sn1, Sn2, Sn3, and Sn4 which are found on the basis of the following expression 3. In finding the cancel voltage value Ej, the offset calculating section 522 implements the calculation without converting the AC component of the double-layer sub voltage value Snj into the DC component. For that reason, the cancel voltage value Ej is a voltage value including the DC component and the AC component.

$$Ej=Snj-Cj \quad \text{(Ex. 3)}$$

Then, the offset calculating section 522 outputs the double-layer main voltage value Mni and the cancel voltage value Ej to the movement control signal generating section 523.

The movement control signal generating section 523 appropriately generates a tracking error signal (hereinafter referred to as "DPP (differential push pull) signal") D for moving the objective lens 370 in the tracking direction by the aid of the objective lens moving section 380. More specifically, the movement control signal generating section 523 acquires the double-layer main voltage value Mni and the cancel voltage value Ej from the offset calculating section 522. Then, the movement control signal generating section 523 appropriately generates the DPP signal D on the basis of the following expression 4, and outputs the DPP signal D to the objective lens movement control section 524.

$$D=(Mn1+Mn4)-(Mn2+Mn3)-K\times((E1+E3)-(E2+E4)) \quad \text{(Ex. 4)}$$

where K is a coefficient determined by a diffraction efficiency of the zeroth-order light beam $R_0$ and the ±first-order light beams $R_{+1}$ and $R_{-1}$ in the grating element 331.

The movement control signal generating section 523 also appropriately generates a focusing error signal for moving the objective lens 370 in a direction along the optical axis of the DVD laser beam which is reflected by the mirror 334 by the aid of the objective lens moving section 380 to output the focusing error signal to the objective lens movement control section 524.

The objective lens movement control section 524 appropriately controls the operation of the objective lens moving section 380, and moves the objective lens 370 in order to adequately condense the light beam on the optical disc 10. More specifically, the objective lens movement control section 524 acquires the DPP signal D and the focusing error signal from the movement control signal generating section 523. Then, the objective lens movement control section 524 supplies a current corresponding to the DPP signal D and the focusing error signal to a coil of the objective lens moving section 380 to move the objective lens 370 to an adequate position.

(Operation of Disc Device)

Figure 10:
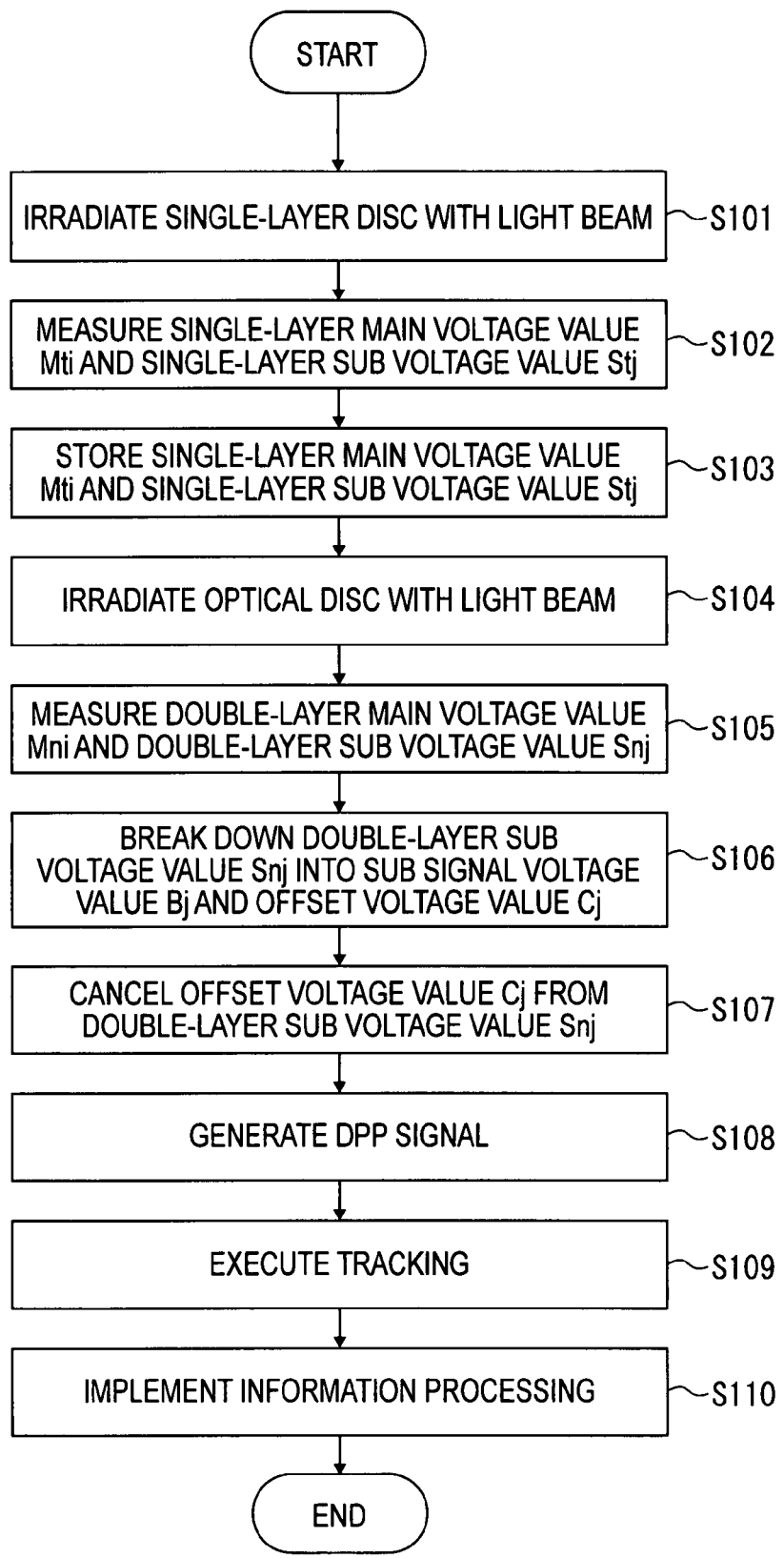
FIG. 10 is a flowchart showing a tracking operation at the time of processing information with respect to the optical disc when a single-layer main voltage value and a single-layer sub voltage value are not stored according to the embodiment.

Subsequently, a description will be given of tracking operation at the time of conducting the information processing with respect to the optical disc 10 when the single-layer main voltage value Mti and the single-layer sub voltage value Stj are not stored, that is, when the disc device 100 is first operated as the operation of the disc device 100 with reference to FIG. 10. FIG. 10 is a flowchart showing the tracking operation at the time of processing information with respect to the optical disc 10 when the single-layer main voltage value Mti and the single-layer sub voltage value Stj are not stored.

First, when an electric power is supplied to the disc device 100, the control circuit section 500 implements an initializing process so as to recognize the position of the information processing section. When the control circuit section 500 recognizes that the single-layer main voltage value Mti and the single-layer sub voltage value Stj are not stored in the memory 400 by the aid of the voltage value acquiring section 521 of the condensing state control section 520, the control circuit section 500 determines whether the single-layer disc has been loaded, or not. In the case where the control circuit section 500 determines that the disc has been loaded, the control circuit section 500 outputs a light beam from the semiconductor laser 320 and irradiates the recording surface of the single-layer disc with the light beam (Step S101). After that, the voltage value acquiring section 521 implements a process of acquiring the voltage value from the photodetecting element 350, that is, a process of measuring the single-layer main voltage Mti and the single-layer sub voltage value Stj (Step S102), and stores the measured single-layer main voltage value Mti and single-layer sub voltage value Stj in the memory 400 (Step S103). In this example, the above-mentioned processing of Step S101 to Step S103 can be implemented at the time of manufacturing the disc device 100 such as shipping inspection, or can be implemented when a user first uses the disc device 100.

After that, the voltage value acquiring section 521 determines whether there is a request for implementing the information processing with respect to the optical disc 10 loaded instead of the single-layer disc, or not. Then, in the case where the voltage value acquiring section 521 determines that the optical disc 10 is loaded, and there is a request for implementing, for example, the reading process that is the information processing, the voltage value acquiring section 521 then irradiates, for example, the zeroth recording layer 13A on which the read information has been recorded with the light beam (Step S104), implements the process of measuring the double-layer main voltage value Mni and the double-layer sub voltage value Snj (Step S105), and outputs the measured double-layer main voltage value Mni and double-layer sub voltage value Snj to the offset calculating section 522. Upon acquiring the respective voltage values Mni and Snj, the offset calculating section 522 reads the respective voltage values Mti and Stj which has been stored in the memory 400, and executes a process of breaking down the double-layer sub voltage value Snj to the first-order light voltage value Bj and the offset voltage value Cj (Step S106). Then, the offset calculating section 522 cancels the offset voltage value Cj from the double-layer sub voltage value Snj to find the cancel voltage value Ej (Step S107), and outputs the cancel voltage value Ej and the double-layer main voltage value Mni to the movement control signal generating section 523.

Upon acquiring the respective voltage values Ej and Mni, the movement control signal generating section 523 generates the DPP signal D (Step S108), and outputs the DPP signal D to the objective lens movement control section 524. Upon acquiring the DPP signal D, the objective lens movement control section 524 appropriately controls the operation of the objective lens moving section 380, and implements the tracking operation that moves the objective lens 370 to an adequate position in the tracking direction (Step S109). Then, the information processing section 510 implements, for example, the reading process that is required for implementation (Step S110).

(Operation and Advantages of Disc Device)

As described above, in this embodiment, the disc device 100 acquires the voltage values corresponding to the intensities of the zeroth-order light beam $R_0$ and the ±first-order light beams $R_{+1}$ and $R_{-1}$ which have been received by the photodetecting element 350 in a state where the single-layer disc is loaded by the aid of the voltage value acquiring section 521. Also, the voltage value acquiring section 521 acquires the voltage values corresponding to the intensities of the zeroth-order light beam $R_0$ and the ±first-order light beams $R_{+1}$ and $R_{-1}$ which have been reflected by the optical disc 10 and then received by the photodetecting element 350 in a state where the information processing section 510 implements the information processing with respect to, for example, the zeroth recording layer 13A of the optical disc 10. Then, the offset calculating section 522 calculates, as the offset voltage value Cj, the voltage value corresponding to the intensity of the stray light beam $R_x$ which has been reflected by the first recording layer 12A which is not to be subjected to the information processing, on the basis of the respective voltage values that have been acquired by the voltage value acquiring section 521. For that reason, the disc device 100 is capable of recognizing the intensities of unnecessary light beams other than the ±first-order light beams $R_{+1}$ and $R_{-1}$ which are adequately reflected and low in the intensity, such as the stray light beam $R_x$ which occurs in the case of the double-layer structure having two recording surfaces such as a DVD+R as the optical disc 10 or diffuse reflection, in correspondence with the offset voltage value Cj, and is capable of adequately recognizing the low intensities of the ±first-order light beams $R_{+1}$ and $R_{-1}$. Therefore, it is possible to prevent malfunction caused by the generation of the improper DPP signal D based on the voltage value including, for example, the unnecessary light beam due to the movement control signal generating section 523, and it is possible to adequately execute the information processing such as the process of reading the information that has been recorded in the optical disc 10, or the recording process for recording the information. In particular, the disc device 100 is effective in the configuration of implementing the information processing using the optical disc 10 in which the recording surfaces are laminated to cause the stray light beam $R_x$.

Also, the disc device 100 acquires the respective voltage values from the photodetecting element 350 at the time when the single-layer disc is loaded and calculates the offset voltage value Cj on the basis of those voltage values. For that reason, even if the disc device 100 changes the characteristic of the optical path as compared with that at the time of the shipping inspection, for example, due to a change of the resin for fixing the respective optical element with the elapse of time, the disc device 100 is capable of calculating the offset voltage value Cj on the basis of the characteristics of the optical path when the user uses the disc device 100. Therefore, the disc device 100 is capable of adequately recognizing the lower intensities of the ±first-order light beams $R_{+1}$ and $R_{-1}$ on the basis of the status at the time of use, for example, as compared with the configuration in which the respective voltage values are stored in the memory 400 at the time of shipping inspection.

The offset calculating section 522 calculates the offset voltage value Cj on the basis of the above-mentioned expressions 1 and 2. More specifically, the offset calculating section 522 finds a ratio of the single-layer sub voltage value Stj and the single-layer main voltage value Mti, that is, divides the single-layer sub voltage layer Stj by the summarization of the single-layer main voltage value Mti to obtain a standardized value, and calculates the offset voltage value Cj on the basis of the standardized value and the like. For that reason, the disc device 100 is capable of appropriately calculating the offset voltage value Cj regardless of, for example, the reflectivities of the respective recording layers 12A and 13A of the optical disc 10, and the distance between the recording layers 12A and 13A. Accordingly, it is possible to excellently recognize the low intensities of the ±first-order light beams $R_{+1}$ and $R_{-1}$, and enhance the convenience of the disc device 100.

Also, the optical pickup 300 is configured in such a manner that the intensity of the zeroth-order light beam $R_0$ that is received by the main photodetecting section 351 becomes sufficiently larger in the amount of light than the intensity of the stray light beam $R_x$. For that reason, the offset calculating section 522 is capable of regarding the double-layer main voltage value Mni actually corresponding to the intensities of the zeroth-order light beam $R_0$ and the stray light beam $R_x$ as the voltage value corresponding to the intensity of only the zeroth-order light beam $R_0$. Therefore, the offset calculating section 522 is capable of more easily executing the process of finding the first-order light voltage value Bj without the necessity of removing the voltage value corresponding to the stray light beam $R_x$ from the double-layer main voltage value Mni in calculating the first-order light voltage value Bj.

In addition, the voltage value acquiring section 521 implements a process of acquiring the respective voltage values from the photodetecting element 350 upon recognizing the fact that the single-layer main voltage value Mti and the single-layer sub voltage value Stj are not stored in the memory 400. On the other hand, the voltage value acquiring section 521 implements a process of acquiring the double-layer main voltage values Mni and Snj without implementing the process of acquiring the respective voltage values from the photodetecting element 350 upon recognizing the fact that the respective voltage values Mti and Stj are stored in the memory 400. As a result, the disc device 100 needs to merely implement the process of storing the respective voltage values Mti and Stj once, and does not need to implement the storing process every time the optical disc 10 is replaced with another one. Accordingly, the disc device 100 is capable of more rapidly and easily calculating the offset voltage value Cj after the respective voltage values Mti and Stj have been stored in the memory 400. Also, it is necessary to implement the work of attaching the single-layer disk only once in order to measure the respective voltage values Mti and Stj, thereby making it possible to improve the usability of the disc device 100. In particular, when the process of measuring the respective voltage values Mti and Stj is implemented at the time of shipping inspection, the user is not troubled, thereby making it possible to further improve the usability of the disc device 100.

MODIFICATION OF EMBODIMENT

The present invention is not limited to this embodiment, but encompasses the following modifications within the scope that is capable of achieving the object of the present invention.

In other words, the voltage value acquiring section 521 has a function of storing the single-layer main voltage value Mti and the single-layer sub voltage value Stj in the memory 400, but may be configured without provision of the above-mentioned function. This configuration makes it possible to simplify the configuration of the voltage value acquiring section 521 and reduce the costs of the disc device 100.

Also, for example, the respective voltage values Mti and Stj that have been measured by the voltage value measuring device may be stored in the memory 400 in advance. With this configuration, the configuration can be simplified without the necessity of providing the function of storing the respective voltage values Mti and Stj in the voltage value acquiring section 521. Accordingly, it is possible to further reduce the costs of the disc device 100.

In addition, a following configuration may be applied. That is, in the case where there is provided, for example, an NBCA (narrow burst cutting area) in which specific information of the optical disc 10 is described, the voltage value acquiring section 521 stores the respective voltage values Mni and Snj of the optical disc 10 in the memory 400 in association with the specific information. After that, when a new optical disc 10 is loaded, the specific information of the loaded optical disc 10 is retrieved from the memory 400. In the case where the specific information can be retrieved, the respective voltage values Mni and Snj that are associated with the specific information are outputted to the offset calculating section 522. On the other hand, in the case where the specific information cannot be retrieved, the respective voltage values Mni and Snj are acquired from the photodetecting element 350 and then outputted to the offset calculating section 522. With this configuration, the disc device 100 needs to merely implement the process of acquiring the respective voltage values Mni and Snj corresponding to the respective optical discs 10 once, and does not need to implement the acquiring process every time the optical disc 10 is replaced with another one. Accordingly, the disc device 100 is capable of more readily achieving the tracking operation after the respective voltage values Mni and Snj of the given optical disc 10 have been stored.

The optical disc 10 that is a disc recording medium was described with the use of the optical disc 10 having the double-layer structure, particularly in the description of the operation. However, as described above, the recording medium is not limited to the optical disc 10 but may be a magnetic optical disc. In addition, there can be applied any configurations such as a cylindrical type having a recording surface on the outer peripheral surface or a tape type other than the disc type. Also, a multilayer structure is available other than the double-layer structure. In addition, there can be applied a configuration in which a diffusely reflected light beam that is attributable to a scratch on the recording surface of the single-layer structure is recognized as the stray light beam $R_x$. More specifically, the voltage value of the diffusely reflected light beam obtained by subtracting the voltage value at the time when, for example, a fresh CD having a single-layer structure without any scratch is loaded from the voltage value at the time when, for example, a reproduced CD having the single-layer structure that may be scratched is loaded can be recognized as the stray light beam $R_x$.

The configuration using the single-layer disc with one recording surface at the time of measuring the respective voltage values Mti and Stj is exemplified. However, the present invention is not limited to the above-mentioned configuration, but may employ a single-layer disc on which no information has been recorded or a reflective plate similar to this single-layer disc.

The disc device 100 including the photodetecting element 350 with the respective three photodetecting sections 351, 352, and 353 was exemplified. However, the present invention can be applied to a configuration including the photodetecting element 350 with one, two, or four or more photodetecting sections.

The disc device 100 that implements the information processing intended for the optical disc 10 was exemplified. However, as described above, the present invention is not limited to the disc device 100, but can be applied to any optical equipments having a configuration that receives light beams reflected by plural layers, such as a camera, a telescope, or a microscope. Also, the present invention is not limited to the configuration that is applied to the disc device 100, but can be applied to an optical state recognizer in which the voltage value acquiring section 521 and the offset calculating section 522 are provided independently of the disc device 100. In addition, the present invention can be applied to a configuration in which the voltage value acquiring section 521, the offset calculating section 522, the movement control signal generating section 523, and the objective lens movement control section 524 are provided independently of the disc device 100, that is, an optical state recognizer in which the condensing state control section 520 is provided independently of the disc device 100.

The light source may be a configuration in which light beams of two wavelengths composed of the CD laser beam and the DVD laser beam are outputted, a configuration in which only any one of those laser beams is outputted, a configuration in which a light beam of another wavelength in addition to the light beams of two wavelengths are outputted, or a configuration in which a CD semiconductor laser that outputs the CD laser beam and the DVD semiconductor laser that outputs the DVD laser beam, respectively, are used. Also, the present invention is not limited to the semiconductor laser 320, but may use any other light sources. In addition, the present invention is not limited to the CD wavelength and the DVD wavelength. In the configuration in which the different wavelengths are outputted, the grating elements 331 each having a diffraction grating corresponding to the wavelength are disposed, respectively.

The above-mentioned respective functions are configured as a program, but may be configured as hardware such as a circuit board, or an element such as one IC (integrated circuit), and may be used as any configurations. The configuration in which the respective functions are read from the program or an additional recording medium makes handling and the expansion of use easier.

In addition, the specific configuration and procedure in implementing the present invention can be appropriately changed to other configuration and procedure within the scope that is capable of achieving the object of the present invention.

ADVANTAGES OF THE EMBODIMENTS

As described above, in this embodiment, the disc device 100 acquires the voltage values corresponding to the intensities of the zeroth-order light beam $R_0$ and the ±first-order light beams $R_{+1}$ and $R_{-1}$ which have been received by the photodetecting element 350 in a state where the single-layer disc is loaded by the aid of the voltage value acquiring section 521. Also, the voltage value acquiring section 521 acquires the voltage values corresponding to the intensities of the zeroth-order light beam $R_0$ and the ±first-order light beams $R_{+1}$ and $R_{-1}$ which have been received by the photodetecting element 350 in a state where the information processing is implemented with respect to, for example, the zeroth recording layer 13A of the optical disc 10 by the aid of the information processing section 510. Then, the offset calculating section 522 calculates the voltage value corresponding to the intensity of the stray light beam $R_x$ reflected by the first recording layer 12A which is not intended for the information processing as the offset voltage value Cj, to thereby recognize the reflected state in the optical disc 10. As a result, the disc device 100 is capable of recognizing the intensity of the unnecessary light beam other than the weak ±first-order light beams $R_{+1}$ and $R_{-1}$ which are adequately reflected, such as the stray light beam $R_x$ that is generated in the case of the double-layer structure having the two recording surfaces such as the DVD+R as the optical disc 10 in correspondence with the offset voltage value Cj, and is capable of adequately recognizing the low intensities of the ±first-order light beams $R_{+1}$ and $R_{-1}$.

INDUSTRIAL APPLICABILITY

The present invention can be used as the optical state recognizer, the information processor, and the optical state recognizing method in which the intensity of a specific light beam, that is received by a photodetecting device which receives at least the zeroth-order light beam and the first-order light beam paired with the zeroth-order light beam which are diffracted by the diffraction grating, and irradiated on and reflected from the recording surface of the recording medium, is recognized.

The invention claimed is:

1. An optical state recognizer for recognizing a state of a light beam that is irradiated from a light source on a diffraction grating, the light beam comprising a transmitted light beam transmitted by the diffraction grating and a diffracted ham beam diffracted by the diffraction grating, the transmitted light beam and the diffracted light beam being irradiated on a recording surface of a recording medium comprising a reference recording medium and a target recording medium and being reflected by the recording surface, the optical state recognizer comprising:

a reference light intensity information acquiring section that acquires reference transmitted light intensity information corresponding to an intensity of the transmitted light beam reflected toward a first region by the recording surface of the reference recording medium whose recording surface has a specific reflection characteristic and reference diffracted light intensity information corresponding to an intensity of the diffracted light beam reflected toward a second region by the reference recording medium;

a detected light intensity information generating section that detects an intensity of the transmitted light beam reflected by the recording surface of the target recording medium toward the first region to generate first detected light intensity information corresponding to the detected intensity of the transmitted light beam and detects an intensity of the diffracted light beam reflected by the recording surface of the target recording medium toward the second region to generate second detected light intensity information corresponding to the detected intensity of the detected light beam; and a reflected state recognizing section that recognizes an optical reflected state of the target recording medium on the basis of a ratio of intensity of the reference transmitted light intensity information and the reference diffracted light intensity information, and intensities of the first detected light intensity information and the second detected light intensity information.

2. The optical state recognizer according to claim 1, wherein the recording surface of the reference recording medium has a single-layer recording surface,
   wherein the recording surface of the target recording medium has a plurality of recording surfaces that are laminated, and
   wherein the reflected state recognizing section recognizes the reflected state of the light beam on one of the plurality of recording surfaces.

3. The optical state recognizer according to claim 2, wherein the reflected state recognizing section calculates the intensity of the second detected light intensity information with respect to the intensity of the first detected light intensity information according to the ratio of the intensity of the reference transmitted light intensity information and the reference diffracted light intensity information, and recognizes the reflected state of the diffracted light beam reflected from the recording surface of the target recording medium onto the second region on the basis of a difference between the calculated intensity of the second detected light intensity information and the intensity of the second detected light intensity information generated by the detected light intensity information generating section.

4. The optical state recognizer according to claim 2, wherein the reflected state recognizing section recognizes a voltage value C corresponding to the intensity of a light beam reflected by another one of the plurality of recording surfaces calculated by the following expression (1) as a reflected state of the optical beam on the target recording medium, $$C = Sn - St \times Mn/Mt \qquad (1)$$

where Mt is a voltage value corresponding to the intensity of the reference transmitted light intensity information, St is a voltage value corresponding to the intensity of the reference diffracted light intensity information, Mn is a voltage value corresponding to the intensity of the first detected light intensity information, and Sn is a voltage value corresponding to the intensity of the second detected light intensity information.

5. The optical state recognizer according to claim 2, wherein
the target recording medium has a disk shape having tracks on which information is substantially spirally or substantially concentrically, and
the second region, includes two second regions with the first region being interposed therebetween,
the optical state recognizer further comprising:
a diffracted light intensity recognizing section that recognizes the intensities of the diffracted light beams respectively reflected toward the two second regions on the one of the plurality of recording surfaces on the basis of the reflected state of the light beam on the target recording medium recognized by the reflected state recognizing section; and
a tracking process controlling section that moves a transmitted light beam irradiated on the one of the plurality of recording surfaces of the target recording medium in a radial direction of the target recording medium on the basis of the intensities of the diffracted light beams recognized by the diffracted light intensity recognizing section.

6. An information processor, comprising:
an optical pickup comprising: a light source; a diffraction grating that transmits and diffracts a light beam outputted from the light source; a condensing section that condenses a transmitted light beam transmitted by the diffraction grating and a diffracted light beam diffracted by the diffraction grating on a recording surface of a recording medium, the recording medium including a reference recording medium whose recording surface has a specific reflection characteristic and a target recording medium; and a photodetector that receives the transmitted light beam and the diffracted light beam reflected by the recording surface of the recording medium to output a predetermined signal; and
an optical state recognizer that recognizes a state of the light beam reflected by the recording surface, the optical state recognizer comprising:
a reference light intensity information acquiring section that acquires reference transmitted light intensity information corresponding to an intensity of the transmitted light beam reflected by the recording surface of the reference recording medium to a first region and reference diffracted light intensity information corresponding to an intensity of the diffracted light beam reflected by the recording surface of the reference recording medium to a seconds region;
a detected light intensity information generating section that detects the intensity of the transmitted light beam reflected by the recording surface of the target recording medium to the first region to generate first detected light intensity information corresponding to the intensity of the detected transmitted light beam and detects the intensity of the diffracted light beam reflected by the recording surface of the target recording medium to the second region to generate second detected light intensity information corresponding to the intensity of the detected diffracted light beam; and
a reflected state recognizing section that recognizes a reflected state of the target recording medium on the basis of a ratio of intensity of the reference transmitted light intensity information and the reference diffracted light intensity information, and intensities of the first detected light intensity information and the second detected light intensity information.

7. An optical state recognizing method for recognizing a state of a light beam irradiated by a light source and reflected by a recording surface of a recording medium, the recording medium comprising a reference recording medium that has a specific reference characteristic and a target recording medium, the method comprising:
interposing a diffraction grating between the light source and the recording surface;
setting a transmitted light beam transmitted by the diffraction grating to be reflected by the recording surface to a first region;
setting a diffracted light beam diffracted by the diffraction grating to be reflected by the recording surface to a second region;
acquiring reference transmitted light intensity information corresponding to an intensity of the transmitted light beam reflected by recording surface of the reference recording medium toward the first region and reference diffracted light information corresponding to the diffracted light beam reflected by the recording surface of the reference recording medium to the second region;
detecting the intensity of the transmitted light beam reflected by the recording surface of the target recording medium to the first region to generate first detected light intensity information corresponding to the intensity of the detected transmitted light beam and detecting the intensity of the diffracted light beam reflected by the recording surface of the target recording medium to the second region to generate second detected light intensity information corresponding to the intensity of the detected diffracted light beam; and
recognizing a reflected state of the light beam by the recording surface of the target recording medium on the basis of a ratio of intensity of the reference transmitted light intensity information and the reference diffracted light intensity information, and intensities of the first detected light intensity information and the second detected light intensity information.

* * * * *